(12) United States Patent
Wang et al.

(10) Patent No.: US 9,035,261 B2
(45) Date of Patent: May 19, 2015

(54) REFLECTOR HAVING ADAPTIVE REFLECTIVITY FOR RADIATION DETECTION

(71) Applicants: Gin-Chung Wang, Grayslake, IL (US); Jerry Wang, Lake Zurich, IL (US); Huini Du, Vernon Hills, IL (US)

(72) Inventors: Gin-Chung Wang, Grayslake, IL (US); Jerry Wang, Lake Zurich, IL (US); Huini Du, Vernon Hills, IL (US)

(73) Assignees: KABUSHIKI KAISHA TOSHIBA, Tokyo (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 104 days.

(21) Appl. No.: 13/691,132

(22) Filed: Nov. 30, 2012

(65) Prior Publication Data

US 2014/0151562 A1 Jun. 5, 2014

(51) Int. Cl.
*G01T 1/20* (2006.01)
(52) U.S. Cl.
CPC .................................. *G01T 1/2002* (2013.01)
(58) Field of Classification Search
CPC ............................... G01T 1/20; G01T 1/2002
USPC .......................................................... 250/362
See application file for complete search history.

(56) References Cited

U.S. PATENT DOCUMENTS

| 5,616,924 | A | 4/1997 | Petrillo | |
|---|---|---|---|---|
| 2008/0290280 | A1* | 11/2008 | Ruetten et al. | 250/361 R |
| 2012/0219114 | A1* | 8/2012 | Iwakiri et al. | 378/62 |

FOREIGN PATENT DOCUMENTS

| JP | 61-164174 A | 7/1986 |
|---|---|---|
| JP | 9-138283 A | 5/1997 |
| JP | 2004-108796 A | 4/2004 |
| JP | 2012-173275 A | 9/2012 |
| WO | WO 2005/088345 A1 | 9/2005 |

OTHER PUBLICATIONS

International Search Report issued Feb. 18, 2014 in PCT/JP2013/081843 with English translation of categories of cited documents.
English translation of the International Search Report issued Feb. 18, 2014, in PCT/JP2013/081843. (Japanese version previously submitted).

\* cited by examiner

*Primary Examiner* — David Porta
*Assistant Examiner* — Edwin Gunberg
(74) *Attorney, Agent, or Firm* — Oblon, McClelland, Maier & Neustadt, L.L.P.

(57) ABSTRACT

Systems, devices, processes, and algorithms for adapting and/or adjusting a reflectivity of a reflector in a radiation detector. The reflectivity can be changed by a reflectivity control signal that is generated based on an estimated count rate of events so as to adjust a probability of a photosensor detecting light resulting from the event via, for example, a scintillation event. By adjusting the probability, an energy resolution of the radiation detector can be optimized. The reflectivity of a reflector can be changed by changing a state of a thin film, a liquid crystal layer, or a suspended magnetic particle layer.

17 Claims, 7 Drawing Sheets

Conventional Example

REFLECTOR HAVING ADAPTIVE REFLECTIVITY FOR RADIATION DETECTION

FIELD OF DISCLOSURE

This disclosure relates to optimizing radiation detection with an adjustable reflector.

BACKGROUND

In positron emission tomography (PET) imaging, a radiopharmaceutical agent is administered, via injection, inhalation, and/or ingestion, to a patient. The physical and bio-molecular properties of the agent then concentrate at specific locations in the human body. The actual spatial distribution, intensity of the point and/or region of accumulation, as well as the kinetics of the process from administration and capture to eventual elimination, all have clinical significance. During this process, the positron emitter attached to the radiopharmaceutical agent emits positrons according to the physical properties of the isotope, such as half-life, branching ratio, etc.

Each positron interacts with an electron of the object, is annihilated and produces two gamma rays at 511 keV, which travel at substantially 180 degrees apart. The two gamma rays then cause a scintillation event at a scintillation crystal of the PET detector, which detects the gamma rays thereby. By detecting these two gamma rays, and drawing a line between their locations or "line-of-response," the likely location of the original annihilation is determined. While this process only identifies one line of possible interaction, accumulating a large number of these lines, and through a tomographic reconstruction process, the original distribution is estimated with useful accuracy. In addition to the location of the two scintillation events, if accurate timing—within a few hundred picoseconds—is available, time-of-flight calculations are also made in order to add more information regarding the likely position of the annihilation event along the line. A specific characteristic of the isotope (for example, energy of the positron) contributes (via positron range and co-linearity of the two gamma rays) to the determination of the spatial resolution for a specific radiopharmaceutical agent.

The above process is repeated for a large number of annihilation events. While every case needs to be analyzed to determine how many scintillation events are required to support the desired imaging tasks, conventionally, a typical 100 cm long FDG (fluoro-deoxyglucose) study accumulates about 100 million counts or events.

Conventionally, as shown in FIG. 10, detection of an event 1000 is performed by a radiation detector, which includes a scintillator array 1002 and a photomultiplier tube (PMT) 1004. The event 1000 causes a scintillation event within the scintillator array 1002, producing light from an interaction of the energy from the event 1000 within a scintillator of the scintillator array 1002. The produced light is detected by the PMT 1004.

The PMT 1004 has an output signal which is filtered and output to a processing unit, which performs counting and time sampling of events, executing algorithms for determining energy, timing, and positions of the events. To increase the probability of the PMT 1004 detecting light produced via a scintillator, the scintillator array 1002 and the PMT 1004 are provided between reflective surfaces, reflectors 1006, which are designed to reflect the light produced via the scintillator.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

This disclosure is directed to devices, systems, algorithms, and processes for radiation detection, and specifically for optimizing a signal-to-noise ratio of measurable energy at a variety of count rates by utilizing adaptive reflectors that have an adaptive reflectivity.

Figure 10:
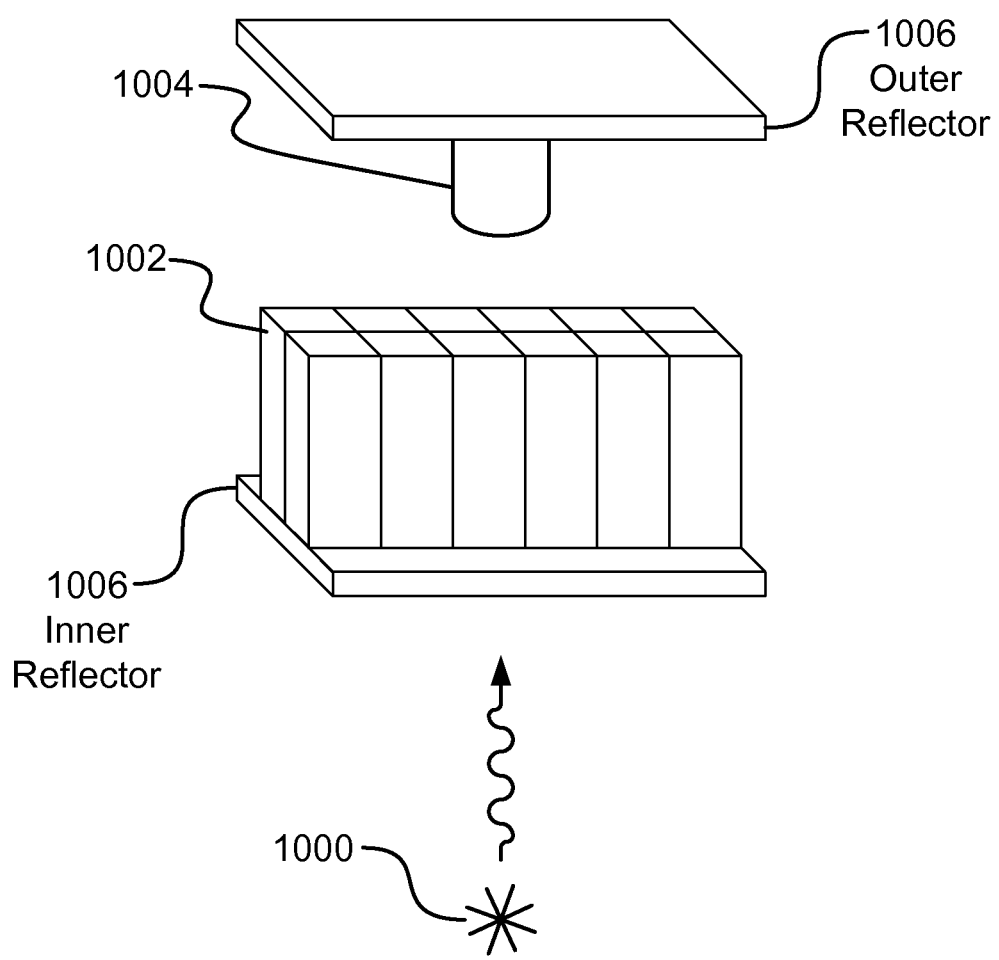
FIG. 10 is a schematic illustration of a conventional radiation detector and an annihilation event.

Conventionally, radiation detection systems, such as PET systems, include reflectors that reflect light from a scintillation event, so as to increase the probability of a photosensor, such as a PMT, sensing or detecting light resulting from the scintillation event. A schematic illustration of a conventional radiation detector is shown in FIG. 10, where an annihilation event 1000 is detected via a scintillator array 1002 and a PMT 1004 provided between reflectors 1006. In this radiation detector, the annihilation event 1000 occurs in, e.g., the body of a patient, such that radiation, such as gamma radiation, passes through a first (inner) reflector 1006 and causes a scintillation event in a scintillator of the scintillator array 1002. Light resulting from the scintillation event is emitted in any direction. If this direction is not directly towards the PMT 1004, then the light can reflect off the inner reflector 1006 and/or a second (outer) reflector 1006, thereby increasing the probability that the light will interact with the PMT 1004. A conventional reflector 1006 can be made out of a plastic, but has a fixed reflectivity.

Based on an estimated count rate of events, pursuant with U.S. patent application Ser. No. 13/153,026, filed Jun. 3, 2011, which is incorporated herein by reference, a processing unit can optimize a detection of events by controlling a filter of the radiation detector. Some aspects of this disclosure relate to controlling a reflectivity of reflectors to optimize a detection of events by a radiation detector, and can be incorporated with the filter control provided by U.S. Ser. No. 13/153,026, as well as other optimization aspects.

A system for radiation detection, can include a rate counter configured to estimate, based on an output signal from a radiation detector, a count rate of events detected by the radiation detector. The system can further include a controller configured to generate a reflectivity control signal, based on the estimated count rate, and to output the reflectivity control signal to a reflector of the radiation detector, the reflectivity control signal causing the reflector to adjust a reflectivity of the reflector to optimize an energy resolution of the radiation detector.

The system can include the radiation detector, which includes a scintillator, a photosensor, and the reflector. The reflector can be configured to reflect light resulting from a scintillation event within the scintillator, so as to increase a probability of the light being detected by the photosensor. The radiation detector can be a photomultiplier tube, and the reflector can include an inner reflector and an outer reflector, such that the radiation detector has a layered structure, including, in this order, the inner reflector, the scintillator, the photosensor, and the outer reflector.

The reflectivity control signal can cause the reflector to adjust a reflectivity of one or more of the inner reflector and the outer reflector. The reflector can include a liquid crystal portion that is controlled by the reflectivity control signal so as to control a reflectivity of the reflector. The liquid crystal portion can be configured to change a reflectivity of the reflector, based on the reflectivity control signal, between a mirror state having a near 100% reflectance, and a black-body state having a near 0% reflectance.

The system can include a plurality of radiation detectors, each including a corresponding scintillator, a photosensor and a reflector, wherein each reflector is configured to reflect light resulting from a scintillation event within the scintillator, so as to increase a probability of the light being detected by the photosensor. The controller can be configured to generate a reflectivity control signal to separately or collectively adjust a reflectivity of each reflector of the plurality of radiation detectors. In particular, the controller can be configured to generate the reflectivity control signal to adjust the reflectivity of each reflector of the plurality of radiation detectors, such that the reflectivity of each reflector of the plurality of radiation detectors is controlled separately, so as to individually optimize an energy resolution of each of the radiation detectors.

A radiation detector can include a scintillator to generate light from a scintillation event, a photosensor configured to detect light generated from a scintillation event, and a reflector configured to reflect light resulting from a scintillation event, so as to increase a probability of light being detected by the photosensor when the light is generated from a scintillation event, where the reflector has an adjustable reflectivity.

The reflector can include a liquid crystal portion that is electronically controlled to adjust a reflectivity of the reflector. The reflector can include a plurality of liquid crystal layers that are electronically controlled to adjust a reflectivity of the reflector. The reflector can include a black-body layer having near 0% reflectance and a reflective particle layer including suspended reflective particles. The suspended reflective particles in the reflective particle layer can be oriented based on an applied magnetic or electric field that is adjustable by a reflectivity control signal. The reflector can include means for adjusting a reflectivity of the reflector.

A radiation detection method can include estimating, by a rate counter, a count rate of events detected by a radiation detector based on an output signal of the radiation detector. Based on the estimated count rate, a reflectivity control signal can be generated to adjust a reflectivity of a reflector of the radiation detector. The reflector can be configured to reflect light resulting from a scintillation event, so as to increase a probability of light being detected by a photosensor of the radiation detector when the light is generated from a scintillation event by a scintillator of the radiation detector. The reflectivity control signal can be output to the reflector of the radiation detector to optimize an energy resolution of the radiation detector.

The reflector can include an inner reflector and an outer reflector, such that the radiation detector has a layered structure, in this order: the inner reflector, the scintillator, the photosensor, and the outer reflector. The reflectivity control signal can cause the reflector to adjust a reflectivity of one or more of the inner reflector and the outer reflector.

The reflector can include a liquid crystal portion that is controlled by the reflectivity control signal so as to control a reflectivity of the reflector. The liquid crystal portion can be configured to change a reflectivity of the reflector, based on the reflectivity control signal, between a mirror state having a near 100% reflectance, and a black-body state having a near 0% reflectance.

Since the reflector is adjustable and adaptable to respond to operating conditions, the reflector is applicable to a wide variety of radiation detectors that produce light, e.g., by a scintillation event. Such detectors include photomultiplier tubes (PMTs) and silicon photomultipliers (SiPMs). However, aspects of this disclosure are applicable to other radiation detectors as well. Such radiation detectors can be used in PET and CT medical imaging systems.

The foregoing paragraphs have been provided by way of general introduction, and are not intended to limit the scope of the following claims. The described exemplary implementations, together with further advantages, will be best understood by reference to the following detailed description taken in conjunction with the accompanying drawings, wherein like reference numerals designate identical or corresponding parts throughout the several views.

Figure 1:
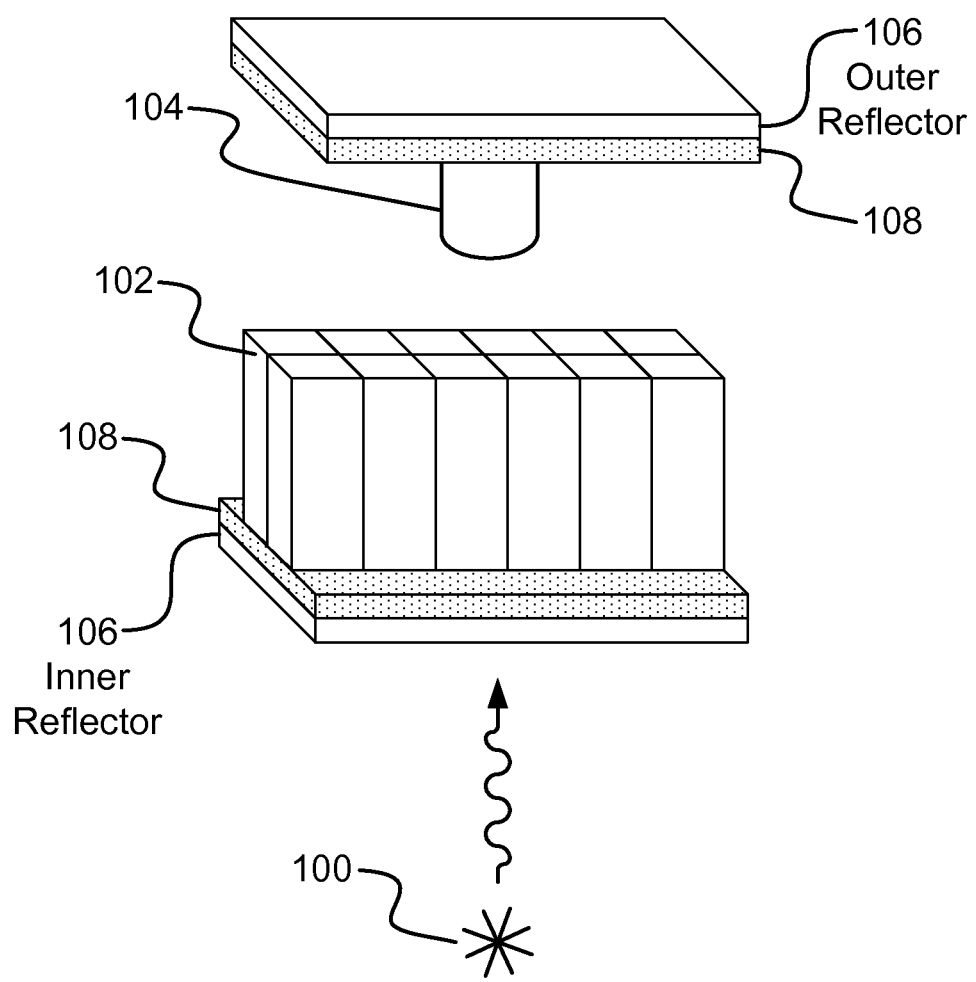
FIG. 1 is a schematic illustration of a radiation detector and an annihilation event.

FIG. 1 illustrates a radiation detection system for detecting an event 100. The radiation detection system includes a scintillator or a scintillator array 102 and a photosensor 104, such as, e.g., a photomultiplier tube (PMT). The event 100 causes a scintillation event within the scintillator array 102, which produces light from an interaction of a gamma ray from the event 100 within a scintillator of the scintillator array 102. The produced light is detected by the photosensor 104.

The photosensor 104 has an output signal that is filtered and output to a processing unit, which performs counting and time sampling of events, and executes algorithms for determining energy, timing, and positions of the events. To increase the probability of the photosensor 104 detecting light produced via a scintillator, the scintillator array 102 and the photosensor 104 are provided between reflective surfaces, reflectors 106, which are designed to reflect the light produced via the scintillator. By reflecting the light, scintillation events that result in light traveling in a direction that is not directly at the photosensor 104 can be detected by the photosensor 104 after one or more reflections by way of the reflectors 106. To vary a level of reflectivity provided by the reflector 106, a variable light absorption layer 108 is applied to reflectors 106.

In one aspect, the reflectors include a highly reflective semiconductor substrate, whereas the variable absorption layer 108 includes a liquid crystal portion. The liquid crystal potion 108 is voltage controlled to act as a variable light filter, absorbing an amount of light proportional or inversely proportional to a voltage applied to the liquid crystal portion. In other words, a transparency of the liquid crystal portion is controlled by a corresponding reflectivity control signal.

Figure 2:
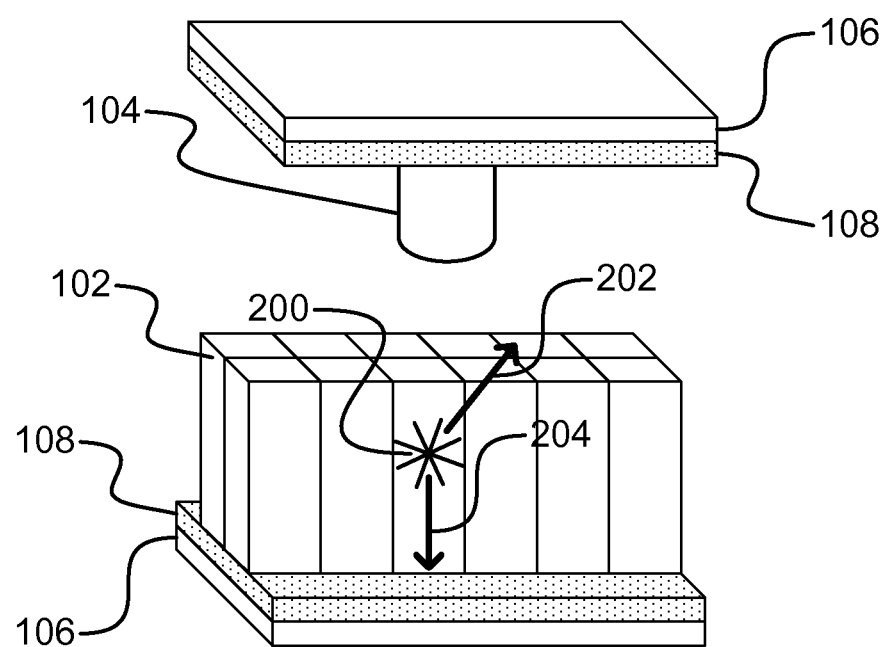
FIG. 2 is a schematic illustration of a radiation detector and a scintillation event.

FIG. 2 illustrates a scintillation event 200 within a scintillator of the scintillator array 102. The scintillation event 200 results in the release of light. This light is directed in any direction, such as direction 202 or direction 204. The light is detected by the photosensor 104 directly, or after one or more reflections by way of the reflectors 106.

By controlling the liquid crystal portion of one or both of the reflectors 106, a reflectivity (e.g., a percent amount of reflectance) of one or both of the reflectors 106 is manipulated. In particular, in one aspect, a reflectivity of one or both of the reflectors 106 is adjusted from a mirror-like reflector, having a near 100% reflectance for one or more wavelengths, to a black-body-like reflector, having a near 0% reflectance for one or more wavelengths. By reducing the reflectivity of one or both of the reflectors 106, a probability of light having a particular energy threshold being detected by the photosensor 104 is reduced. Consequently, a number of counts, i.e. a count rate, can be reduced, and the reflectivity of one or both of the reflectors 106 can be controlled to optimize event detection by a processing unit.

Figure 3:
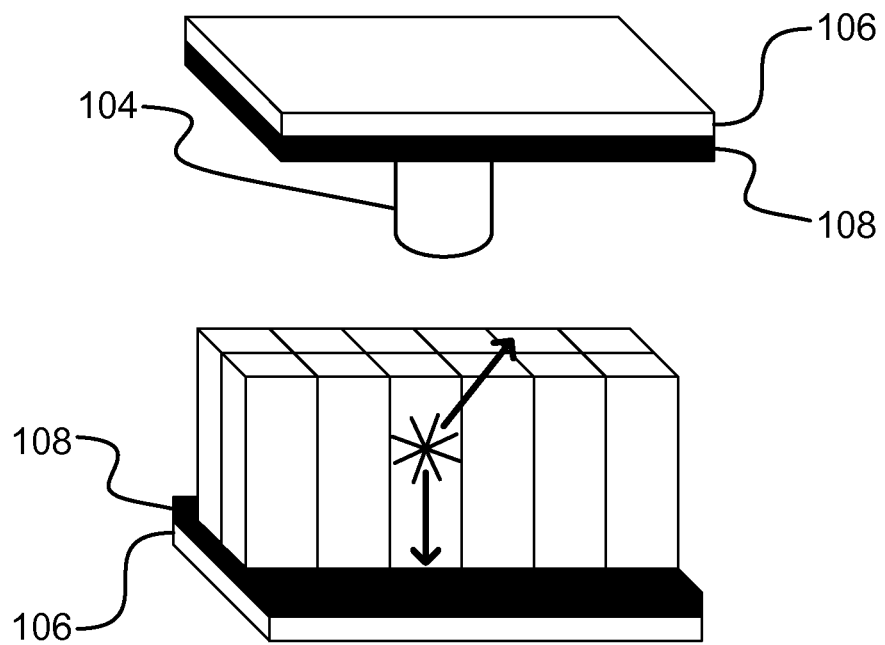
FIG. 3 is a schematic illustration of a radiation detector in a low reflectivity mode.

FIG. 3 illustrates an exemplary state of a liquid crystal portion of one or both of the reflectors 106. In FIG. 3, the liquid crystal portion of both of the reflectors 106 is in a black-body-like state, in which a reflectivity of one or both of the reflectors 106 is minimized. In this state, the liquid crystal portion of one or both of the reflectors 106 absorbs one or more wavelengths of light resulting from a scintillation event.

Figure 4:
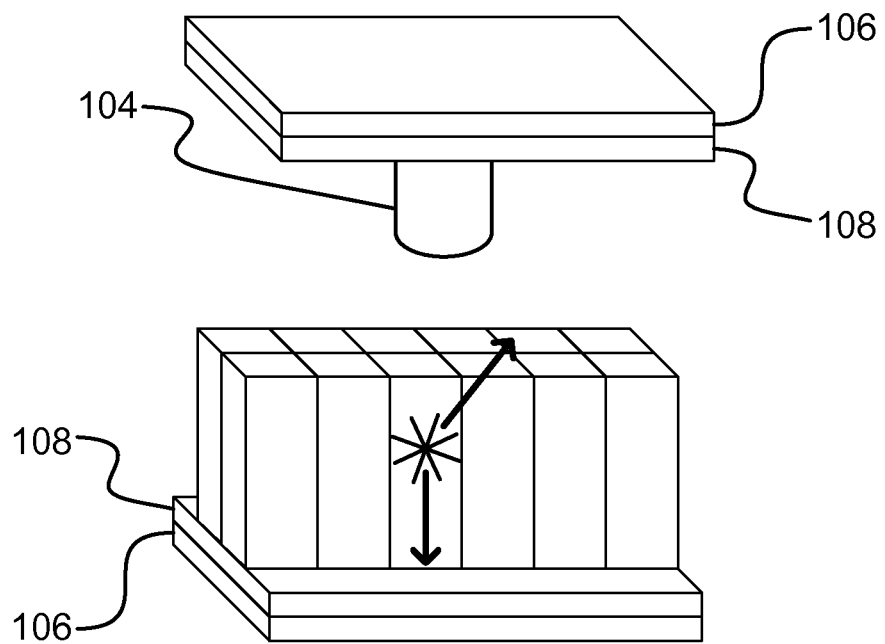
FIG. 4 is a schematic illustration of a radiation detector in a high reflectivity mode.

FIG. 4 illustrates an exemplary state of a liquid crystal portion of one or both of the reflectors 106. In FIG. 4, the liquid crystal portion of both of the reflectors 106 is in a mirror-like state, in which a reflectivity of one or both of the reflectors 106 is maximized. In this state, the liquid crystal portion of one or both of the reflectors 106 is configured so as to pass through one or more wavelengths of light resulting from a scintillation event, to maximize an amount of light and a probability of light being detected by the photosensor 104.

The liquid crystal portion includes one or more layers or thin films, where each layer absorbs one or more different wavelengths or one or more different ranges of wavelengths of light. With such a structure, certain wavelengths or ranges of wavelengths of light are effectively filtered, thereby reducing an amount of light of predetermined wavelengths from being detected by the photosensor 104. Furthermore, a reflectivity of the outer reflector 106 can be adjusted differently and separately than a reflectivity of the inner reflector 106. On the other hand, a reflectivity of both of the outer and inner reflectors 106 can be adjusted together, in a single operation. A reflectivity of both of the outer and inner reflectors 106 can also be adjusted to have a same value of reflectance or different values of reflectance. Moreover, depending on a sensitivity of a particular photosensor 104, a reflectivity of one or both of the outer and inner reflectors 106 adjusted based on the sensitivity of the particular photosensor 104 and/or based on a sensitivity of the scintillator array 106.

An apparatus and/or system including a plurality of separate radiation detection systems, as separate units, can be provided. In such a system, the separate radiation detection systems are arranged around, e.g., in a circular fashion, a patient. Each separate radiation detection system includes one or more scintillation arrays 102, one or more photosensors 104, and a set of reflectors 106, which is flat or curved to conform to the circular fashion of arrangement around the patient. These separate units are controlled independently, or as one functional unit in a single operation, by a controller, with respect to adjusting reflectivity. Additionally, based on various sensitivities of particular scintillation arrays and particular photosensors, an amount of reflectivity of each of the separate units can be predefined so as to provide similar overall sensitivities amongst the plurality of separate units. These predefined characteristics can then be adjusted during maintenance or repair procedures.

The scintillation array 102 and the photosensor 104 are provided as separate units, or together in a photomultiplier tube. Furthermore, the reflectors 106 are also incorporated into such a photomultiplier tube, or arranged so as to sandwich the scintillation array 102 and the photosensor 104 of such a photomultiplier tube. In some implementations, lenses are incorporated with a scintillation array and a photosensor. In particular, one or more lenses are utilized to focus and/or direction light from the scintillation array to the photosensor. In a particular design, a reflector having an adjustable reflectivity is not provided at an outer side when light is focused with a lens, such that only an inner reflector is provided with an adjustable reflectivity. A lens and only a single adjustable (inner) reflector can also be incorporated into a single photomultiplier tube.

Figure 5:
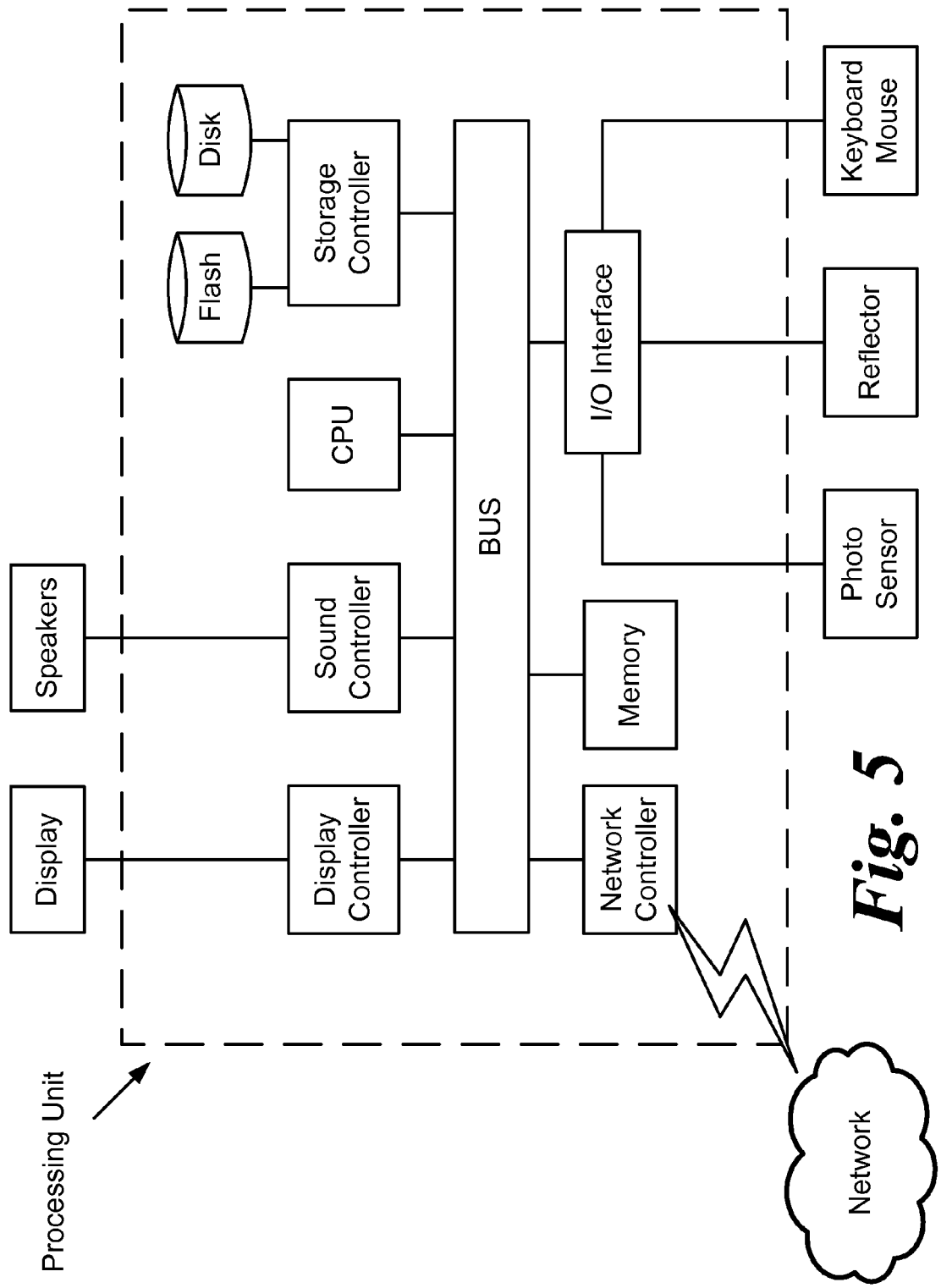
FIG. 5 is a schematic illustration of a hardware arrangement of a processing unit.

Aspects of digital filtering, control processing, and generating of signals to adjust an analog-to-digital converter, a filter, and/or a reflectivity of a reflector are implemented, by example, utilizing a computer processor of, e.g., a digital signal processor. The digital signal processor can be provided in part or in whole as a processing unit. An exemplary processing unit is shown in FIG. 5.

The processing unit preferably includes a central processing unit (CPU), which can include a plurality of processing cores. The CPU can be implemented as discrete logic gates, as an Application Specific Integrated Circuit (ASIC), a Field Programmable Gate Array (FPGA) or other Complex Programmable Logic Device (CPLD). An FPGA or CPLD implementation is coded in VHDL, Verilog or any other hardware description language and the code is stored in an electronic memory directly within the FPGA or CPLD, or as a separate electronic memory, such as a memory connected to the CPU by way of a common BUS as shown in FIG. 5.

In some aspects, the electronic memory is non-volatile, such as ROM, EPROM, EEPROM or FLASH memory. The electronic memory can also be volatile, such as static or dynamic RAM, and a processor, such as a microcontroller or microprocessor, can be provided to manage the electronic memory as well as the interaction between the FPGA or CPLD and the electronic memory.

The CPU can execute algorithms and computer programs including computer-readable instructions that perform the functions described herein. The program can be stored on various mediums, including any of the above-described non-transitory electronic memories (such as a solid state drive or flash drive) or a disk drive, such as a hard disk, CD or DVD drive. Further, the computer-readable instructions can be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems.

Signals received by the processing unit are processed to obtain an energy value of an event and/or a timing of an event. Timing and energy evaluation information is displayed on a display, such as a LCD display, by way of a display controller. The information can also be stored locally, by a storage controller, to a storage device or transmitted by way of a network controller to networked devices.

In some aspects, the processing unit includes special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). The processing unit can include a discrete digital filter which performs mathematical processes on input signals and includes FPGAs or ASICs. Alternatively, the CPU of processing unit is configured by software to perform digital filtering.

The processing unit can be embodied in a personal computer and can include a display controller coupled to a display. The processing unit can also include an input/output interface for receiving and transmitting signals between an analog-to-digital converter (ADC), a digital-to-analog converter (DAC), a filter unit, and a reflector 106. The input/output interface can communicate with peripherals for user control of aspects of the processing unit by way of a keyboard and mouse. Additionally, a printer (not shown) can be provided.

Output detection signals from a radiation detector (hereinafter referred to as output signals) are electronic pulses resulting from the detector detecting an event (a particle interaction) by receiving radiation therefrom. In radiation detecting, this output pulse is shaped by a filter to remove noise for accurate counting of detected events.

A filter unit applies filtering to an analog output signal of the detector and can include an adjustable portion. The filtering causes shaping of the pulse of the output signal. A filter unit can incorporate bandwidth adjustable filters, and the filters can be adjustable to control integration and differential times thereof continuously in response to an estimated count rate control signal.

The output signal from the radiation detector, after being filtered by the filter unit, is then converted to a digital signal by an ADC. The ADC has a sampling rate at which the analog signal is sampled, wherein the sampling rate is adjustable by a control signal. The sampling rate is preferably initially set to a maximum or fastest sampling rate of the ADC. The resulting digital signal is then processed by the DSP.

The DSP outputs control signals to adjust the adjustable portions of the filter unit and the ADC. In particular, the digital signal processing unit can output a count rate estimation control signal to a digital-to-analog converter (DAC), which after passing through a low-pass filter, is input to the filter unit. This count rate estimation control signal serves to change the bias voltage of a voltage controlled capacitor, and thus the RC time constant, of an adjustable functional component of the filter unit, for example. Alternatively, the count rate estimation control signal is a digital control signal for instructing the filter unit to open or close various switches of the filter unit to change the RC time constant of the filtering performed by the filter unit.

The processing unit can also generate a control signal to cause a sampling rate adjustment at the ADC. The sampling rate (the rate at which the analog output signal from the radiation detector is sampled) is preferably initially set to a maximum or fastest sampling rate of the ADC. However, when the count rate falls below a predetermined threshold value, the fastest sampling is not necessary for adequate energy resolution. Accordingly, the DSP adjusts the sampling rate of the ADC to slow the sampling rate by an amount having a direct relationship with an amount the count rate has fallen below a predetermined threshold value, so as to conserve energy usage.

The filtering of an output signal from a radiation detector and the sampling of that output signal can be adjusted in real-time and continuously as events are detected. Accordingly, degradation due to pile-ups can be avoided while efficiently operating an ADC.

Filtering performed by a filter unit is performed by an analog filter, a digital filter embodied in the DSP, or a combination thereof. In this aspect of incorporating a digital filter, the detector outputs an analog signal, through a preamplifier, to an ADC, which generates a digital signal to be processed by the DSP. The DSP internally estimates the count rate and adjusts parameters of the digital filtering performed therein, while also outputting a sampling rate adjustment to the ADC, based on the estimated count rate. Such digital filtering can be performed in addition to analog filtering.

In a similar fashion to controlling a filter, an output signal can be transmitted to a reflector 106, and particularly to a liquid crystal portion of the reflector 106, to adjust a reflectivity of the reflector 106 based on an estimated count rate of the DSP. This output signal can be referred to as a reflectivity control signal. Consequently, a count rate can be controlled, and degradation due to pile-ups can be avoided.

The processing unit schematically illustrated in FIG. 5 is merely exemplary, and one or more processors in a multi-processing arrangement can also be employed to execute sequences of instructions contained in memory. In alternative embodiments, hard-wired circuitry can be used in place of or in combination with software instructions. Thus, embodiments are not limited to any specific combination of hardware circuitry and software.

Software is tangibly stored on computer readable medium of the processing unit, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software can include, but is not limited to, device drivers, operating systems, development tools, and applications software.

Computer code elements on the above-noted medium can be any interpretable or executable code mechanism, including but not limited to scripts, interpretable programs, dynamic link libraries (DLLs), Java classes and complete executable programs. Moreover, parts of the processing of aspects of this disclosure can be distributed for better performance, reliability and/or cost.

The processing unit estimates a count rate based on the pulsed output signals from the radiation detector(s). Generally, counting is performed per channel or per radiation detector, and is based on an amplitude threshold. Specifically, when an amplitude of an output signal (pulse) from a radiation detector exceeds a predefined amplitude threshold, a count is made. The processing unit then calculates a number of counts per second, which is used as a count rate estimation. It should be appreciated that aspects of this disclosure are not limited to any particular count rate estimation process.

Figure 6:
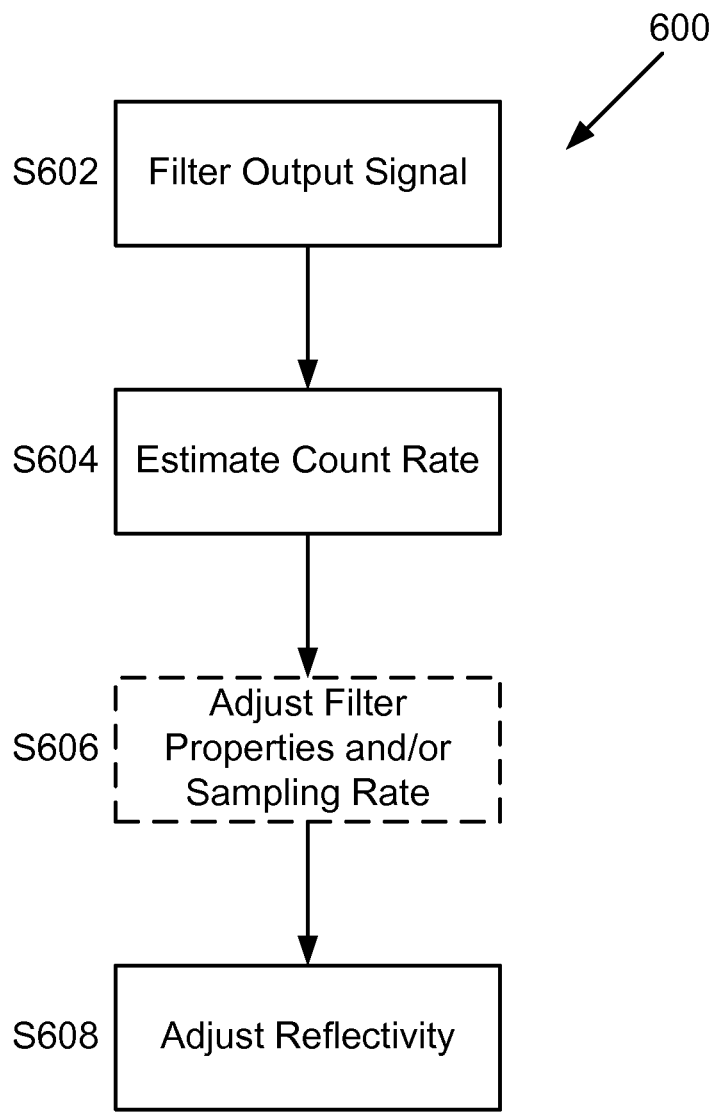
FIG. 6 illustrates an algorithm, by way of a flowchart, for adaptively controlling a reflectivity of a reflector.

An exemplary algorithm, process and/or procedure for adapting a reflectivity of a reflector is shown in FIG. 6 by flowchart 600. At S602, a radiation detector generates an output signal, which is filtered by a filter. A processing unit performs count rate estimation at S604. Based on the estimated count rate, the processing unit can adjust a filtering parameter (e.g., an RC time constant or digital filter property) of the filter at S606 by transmitting a corresponding control signal to the filter, or causing the CPU to execute filtering, as a process, according to a modified parameter. Based on the estimated count rate, the processing unit adjusts a reflectivity of the reflector by outputting a corresponding control signal or bias voltage of an appropriate value.

The reflectivity of the reflector can be adjusted to decrease a reflectance thereof when an amount the count rate rises above a prescribed value. The reflectivity of the reflector can be adjusted to decrease a reflectance thereof in a direct relationship with the count rate. This direct relationship can be linear, exponential, polynomial, or stepwise. However, other direct relationships can be used based on the particular type of radiation detector and other operating conditions.

Upper and lower bound thresholds can be used to define regions of operation (specifically, ranges of count rates), which the reflectivity can be adjusted based on. In particular, a reflectivity can be maintained in a predefined count rate range. In one example, a mirror-like reflectivity can be maintained until a count rate or an estimated count rate reaches a predefined amount. Then, a 50% (for example) reflectivity can be maintained until the count rate reaches a second predefined amount, which is higher than the predefined amount. Then, a black-body (near 0% amount) reflectivity can be maintained while the count rate is above the second predefined amount. In the above example, numerous reflectivity levels can be utilized—not just the three noted above. That is, a plurality of ranges can be utilized. These ranges can be stored in discretized tables of the processing unit.

The above described implementations and examples relate to the use of a liquid crystal portion on a reflective substrate. Alternative or additional reflectors are shown in FIGS. 7-9.

Figure 7:
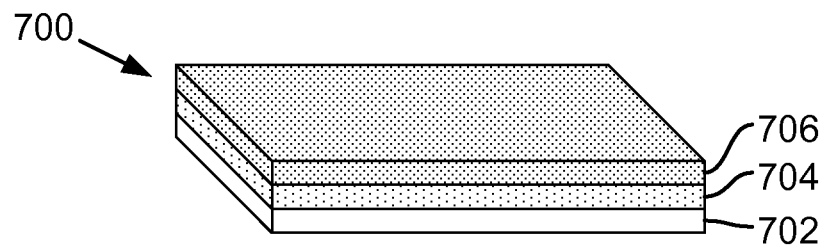
FIGS. 7-9 schematically illustrate various reflectors.

FIG. 7 schematically illustrates a multi-layered reflector 700, which is an inner reflector, an outer reflector, or both an inner reflector and an outer reflector. The multi-layered reflector 700 includes a highly reflective, near-mirror substrate 702, which is a highly polished semiconductor or a transparent semiconductor or glass substrate atop a highly reflective layer. The substrate 702 has two layers 704 and 706 layered atop. The two layers 704 and 706, in some implementations, are liquid crystal portions that are separately tuned to filter and/or absorb different wavelengths or ranges of wavelengths. These two layers 704 and 706 can be separately controlled by a processing unit.

Figure 8:
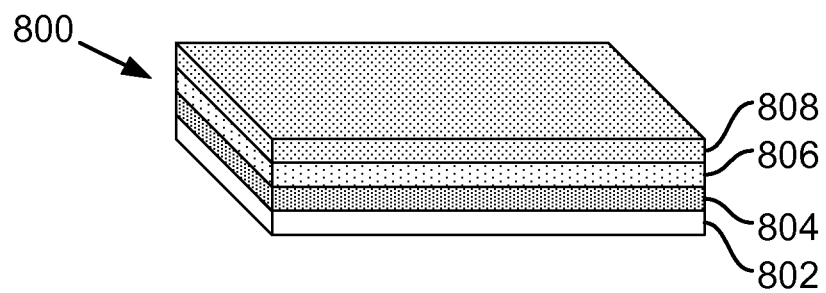
Figure 9:
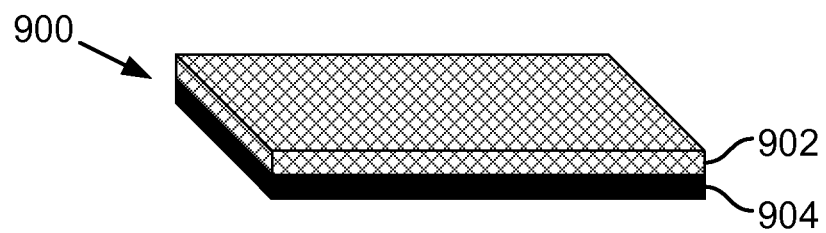

FIG. 8 schematically illustrates a multi-layered reflector 800, which is an inner reflector, an outer reflector, or both an inner reflector and an outer reflector. The multi-layered reflector 800 includes a highly reflective, near-mirror substrate 802, which is a highly polished semiconductor or a transparent semiconductor or glass substrate atop a highly reflective layer. The substrate 802 has three layers 804, 806 and 808 layered atop. The layers can be liquid crystal portions that are separately tuned to filter and/or absorb different wavelengths or ranges of wavelengths. These layers can be separately controlled by a processing unit.

Alternatively, one or two of the layers can be liquid crystal layers, whereas one or two of the layers can be non-voltage controlled light responsive layers. For example, one of the layers, such as layer 804 can be a photochromatic film, which darkens when exposed to light. Alternatively, the photochromatic film can provided with the substrate 802, without any other layer.

In this implementation, the photochromatic film darkens based on a thermal temperature. Accordingly, the reflectivity of the substrate 802 is controlled based on both the photochromatic film, which self-darkens, and controlling a temperature of the radiation detector, specifically, the substrate 802 and the photochromatic film. Temperature control is conducted through, e.g., thermocouples and/or thermoelectrics.

FIG. 9 schematically illustrates a single-layered reflector 900, which is an inner reflector, an outer reflector, or both an inner reflector and an outer reflector. The single-layered reflector 900 includes or consists of a single layer 902, which is a magnetically controlled layer, which has a natural state of passing light or blocking/reflecting light, and an opposing active state. The layer includes suspended magnetic particles, such as metal particles, that are highly reflective when oriented in one direction and not reflective when oriented in another direction. The magnetic state (alignment) of the particles is varied based on a voltage output of a processing unit, and an amount of the reflectance provided by the magnetic particles, in a meaningful direction for light detection by a photosensor, is varied by adjusting the alignment of the particles in varying degrees between first and second particle orientations.

In the single-layered reflector 900, a black-body backing layer 904 can be provided. This black-body backing layer 904 can have a near 0% reflectance to minimize a reflectance. Thus, when a state of the layer 902 is such that is passes light, and does not block or reflect light, the passed light is at least mostly absorbed by the black-body backing layer 904.

Although the various reflectors 700, 800 and 900 are described as single or multi-layered, it should be appreciated that the number of layers, in some implementations, merely refers to functional layers, and any individual layer, in some implementations, includes multiple or dozens of thin films or other layers to form the one or more functional layers. Moreover, various layers discussed herein can be combined in ways not explicitly described herein to provide adaptive and adjustable reflectivity.

While certain embodiments have been described, these embodiments have been presented by way of example only, and are not intended to limit the scope of this disclosure. Indeed the novel devices, systems and methods described herein can be embodied in a variety of other forms; furthermore, various omissions, substitutions, and changes in the form of the devices, systems and methods described herein can be made without departing from the spirit of this disclosure. The accompanying claims and their equivalents are intended to cover such forms or modifications as would fall within the scope and spirit of this disclosure.

The invention claimed is:

1. A system for radiation detection, comprising:
a radiation detector that includes a scintillator, a photosensor and a reflector, the reflector including a plurality of liquid crystal layers that are each separately tuned to filter or absorb different ranges of wavelengths;
a rate counter configured to estimate, based on an output signal from the radiation detector, a count rate of events detected by the radiation detector; and
a controller configured to generate a reflectivity control signal, based on the estimated count rate, and to output the reflectivity control signal to the reflector, the reflectivity control signal causing the reflector to adjust a reflectivity of the reflector to optimize an energy resolution, wherein
the reflector is configured to reflect light, resulting from a scintillation event within the scintillator, to increase a probability of the light being detected by the photosensor.

2. The system according to claim 1, wherein the radiation detector is a photomultiplier tube.

3. The system according to claim 1, wherein
the reflector includes an inner reflector and an outer reflector, such that the radiation detector has a layered structure, including, in this order: the inner reflector, the scintillator, the photosensor, and the outer reflector, and
the inner reflector includes a first liquid crystal layer of the plurality of liquid crystal layers and the outer reflector includes a second liquid crystal layer of the plurality of liquid crystal layers.

4. The system according to claim 3, wherein the reflectivity control signal causes the reflector to adjust a reflectivity of one or more of the inner reflector and the outer reflector.

5. The system according to claim 1, wherein the liquid crystal layers are configured to change a reflectivity of the reflector, based on the reflectivity control signal, between a mirror state having a near 100% reflectance, and a black-body state having a near 0% reflectance.

6. The system according to claim 1, further comprising:
a plurality of radiation detectors, each including a corresponding scintillator, a photosensor and a reflector, the reflector including a plurality of liquid crystal layers that are each separately tuned to filter or absorb different ranges of wavelengths, wherein each reflector is configured to reflect light, resulting from a scintillation event within the scintillator, to increase a probability of the light being detected by the photosensor, and the controller is configured to generate a reflectivity control signal to adjust a reflectivity of each reflector of the plurality of radiation detectors.

7. The system according to claim 6, wherein the controller is configured to generate the reflectivity control signal to adjust the reflectivity of each reflector of the plurality of radiation detectors, such that the reflectivity of each reflector of the plurality of radiation detectors is controlled separately to individually optimize an energy resolution of each of the radiation detectors.

8. A radiation detector, comprising:
a scintillator to generate light from a scintillation event;
a photosensor configured to detect light generated from a scintillation event; and
a reflector that includes a plurality of liquid crystal layers that are each separately tuned to filter or absorb different ranges of wavelengths, the reflector being configured to reflect light, resulting from a scintillation event within the scintillator, to increase a probability of light being detected by the photosensor, wherein
the reflector has an adjustable reflectivity.

9. The radiation detector according to claim 8, wherein each of the liquid crystal layers of the reflector are electronically controlled to adjust a reflectivity of the reflector.

10. The radiation detector according to claim 8, wherein the reflector includes a black-body layer having near 0% reflectance and a reflective particle layer including suspended reflective particles.

11. The radiation detector according to claim 10, wherein the suspended reflective particles in the reflective particle layer can be oriented based on an applied magnetic or electric field that is adjustable by a reflectivity control signal.

12. The radiation detector according to claim 8, wherein the reflector receives a control signal that adjusts a reflectivity of the reflector.

13. A radiation detection method, comprising:
estimating, by a rate counter, a count rate of events detected by a radiation detector based on an output signal of the radiation detector, the radiation detector including a scintillator, a photosensor and a reflector, the reflector including a plurality of liquid crystal layers that are each separately tuned to filter or absorb different ranges of wavelengths;

generating, based on the estimated count rate, a reflectivity control signal to adjust a reflectivity of the reflector, the reflector configured to reflect light resulting from a scintillation event, to increase a probability of light being detected by the photosensor when the light is generated from a scintillation event by the scintillator;

outputting the reflectivity control signal to the reflector; and tuning, by the reflector, the liquid crystal layers to optimize an energy resolution of the radiation detector according to the reflectivity control signal.

14. The method according to claim 13, wherein
the reflector includes an inner reflector and an outer reflector, such that the radiation detector has a layered structure, in this order: the inner reflector, the scintillator, the photosensor, and the outer reflector, and
the inner reflector includes a first liquid crystal layer of the plurality of liquid crystal layers and the outer reflector includes a second liquid crystal layer of the plurality of liquid crystal layers.

15. The method according to claim 14, wherein the reflectivity control signal causes the reflector to adjust a reflectivity of one or more of the inner reflector and the outer reflector.

16. The method according to claim 13, wherein each of the liquid crystal layers are controlled by the reflectivity control signal to control a reflectivity of the reflector.

17. The method according to claim 16, wherein each of the liquid crystal layers are configured to change a reflectivity of the reflector, based on the reflectivity control signal, between a mirror state having a near 100% reflectance, and a black-body state having a near 0% reflectance.

* * * * *